United States Patent [19]
Inman et al.

[11] Patent Number: 6,062,004
[45] Date of Patent: May 16, 2000

[54] METHOD AND DEVICE FOR PROVIDING COMPOST BAGGING MACHINE WITH PERFORATED CONDUIT

[75] Inventors: Larry Inman, Warrenton, Oreg.; Ron Garvin, Meridian, Id.; Michael Stenblom, Astoria, Oreg.

[73] Assignee: Ag-Bag International Limited, Warrenton, Oreg.

[21] Appl. No.: 09/222,034

[22] Filed: Dec. 29, 1998

[51] Int. Cl.⁷ .............................. B65B 9/15; B65B 61/02
[52] U.S. Cl. ......................... 53/576; 53/128.1; 53/513; 53/522; 83/308
[58] Field of Search .............................. 53/576, 577, 575, 53/128.1, 111 R, 522, 513, 435, 428, 459, 469, 567; 83/308; 100/65, 98 A, 100, 144; 114/71, 73, 114; 52/192, 198; 71/9, 901

[56] References Cited

U.S. PATENT DOCUMENTS

| | | | |
|---|---|---|---|
| 3,222,853 | 12/1965 | Michael | 100/145 X |
| 3,687,061 | 8/1972 | Eggenmuller et al. | 100/65 |
| 4,230,676 | 10/1980 | Taylor | 422/62 |
| 4,635,316 | 1/1987 | Towne et al. | 83/308 X |
| 4,666,854 | 5/1987 | Sugiura | 435/313 |
| 5,093,080 | 3/1992 | Keller | 422/40 |
| 5,269,829 | 12/1993 | Meyer | 71/9 |
| 5,345,744 | 9/1994 | Cullen | 53/128.1 |
| 5,426,910 | 6/1995 | Cullen | 53/128.1 |
| 5,566,532 | 10/1996 | Inman et al. | 53/576 X |

FOREIGN PATENT DOCUMENTS

1508065 A2  9/1989  U.S.S.R. .

*Primary Examiner*—James F. Coan
*Attorney, Agent, or Firm*—Robert L. Harrington

[57] ABSTRACT

A method and device for providing a compost bagging machine with perforated conduit. A perforating mechanism is mounted at an inlet to a guide tube that directs conduit into the bag of the bagging machine. Three or more wheels, each of which have at least one piercing blade are freely rotatably mounted on a base plate at the entry of the guide tube. As the conduit is fed through the perforating mechanism, the conduit will rotatably drive the wheels and the piercing blades will produce openings in the conduit.

3 Claims, 3 Drawing Sheets

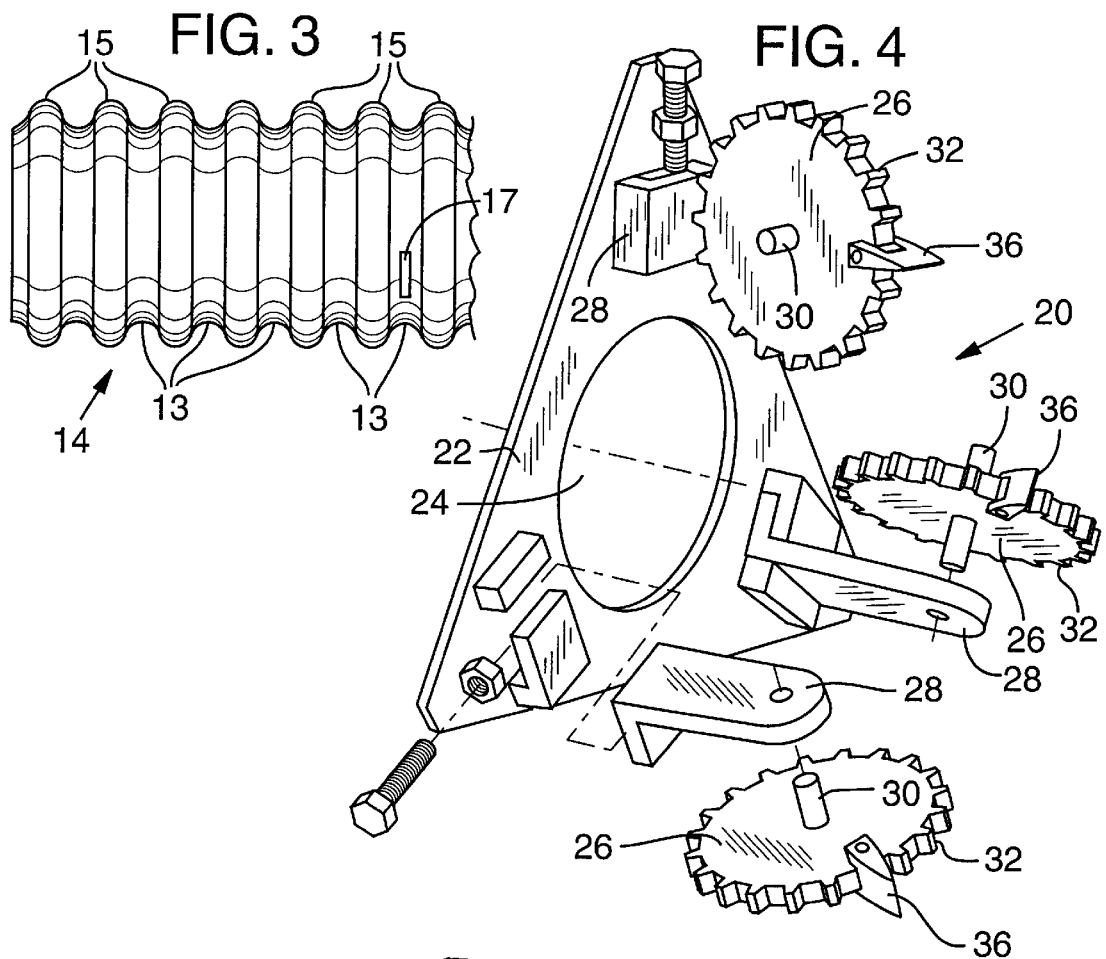
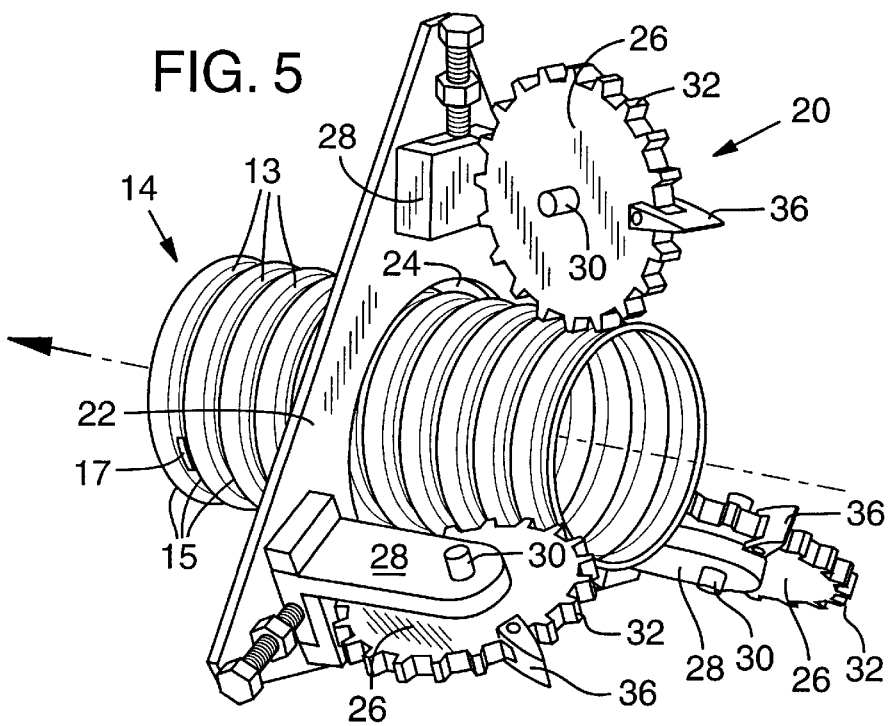

METHOD AND DEVICE FOR PROVIDING COMPOST BAGGING MACHINE WITH PERFORATED CONDUIT

FIELD OF THE INVENTION

This invention relates to a bagging machine and method of providing perforated conduit for venting of compost in large plastic bags, and more particularly to the device and method of providing perforations in the conduit.

BACKGROUND OF THE INVENTION

Recent developments in composting refuse have resulted in the composting of refuse or other organic compost material in large plastic bags with vent conduit extended along the length of the bag to provide desired air flow into and through the compost material. The vent conduit is perforated with at least one end protruded from the bag and connected to a pump for pumping ambient air (sometimes treated with moisture or other media treatments) through the compost material.

The perforations in the conduit, of course, provide air flow into the compost material and prior systems use pre-perforated conduit that are provided on a reel and fed into the plastic bag during the bagging process. The process described is disclosed in the commonly owned U.S. Pat. No. 5,461,843.

The conduit that is most widely used is corrugated PVC that is readily obtained on the market and already wound onto reels. However, such is not commonly pre-perforated and either the supplier has to provide a special order, where the conduit is perforated prior to winding on the reel, or the conduit, when received from the supplier, has to be removed from the reel, perforated and rewound back onto the reel. Furthermore, the desired frequency of the holes may change from one job to the other to achieve a desired aeration of the particular material being composted. A supplier and/or user then has to stock multiple types of preperforated conduit. Any of the above adds substantially to the cost of the composting process.

BRIEF DESCRIPTION OF THE INVENTION

In the preferred embodiment of the invention, the reel of non-perforated conduit is mounted to the bagging machine. Whereas previously the perforated conduit was directed from the reel and into a feed tube that feeds the conduit into a bag (during the bag filling process), the machine of the preferred embodiment is modified to carry a conduit perforating device, e.g., mounted to or adjacent the mouth of the feed tube. The non-perforated conduit is directed off the reel and through the perforating device before it enters the feed tube.

The perforating device includes a base plate having a center opening sized to pass the conduit. One or more (preferably three) perforating wheels are mounted on the plate spaced around the center opening. The wheels are each freely rotatable on a center axle carried by a bracket that is mounted to the base plate. The periphery of the wheels are configured to have cogs that engage the valleys between the upstanding ridges of the corrugated conduit. As the conduit is fed through the feed tube, the wheels are rotated. At a selected cog position (or positions) on the periphery of the wheel, a piercing blade is mounted on a cog which repeatedly pierces through the conduit as the wheels are turned and thereby produces the perforations for the air flow.

The invention will be more fully appreciated upon reference to the following detailed description having reference to the accompanying drawings.

BRIEF DESCRIPTION OF THE DRAWINGS

FIG. 3 is a view of a corrugated conduit utilized in the machine of FIG. 1;

FIG. 4 is an exploded view of a conduit piercing mechanism of the bagging machine of FIG. 1; and FIG. 5 is another view of the piercing mechanism of FIG. 4 showing the conduit of FIG. 3 being pierced by the conduit piercing mechanism.

DESCRIPTION OF THE PREFERRED EMBODIMENT

Figure 1:
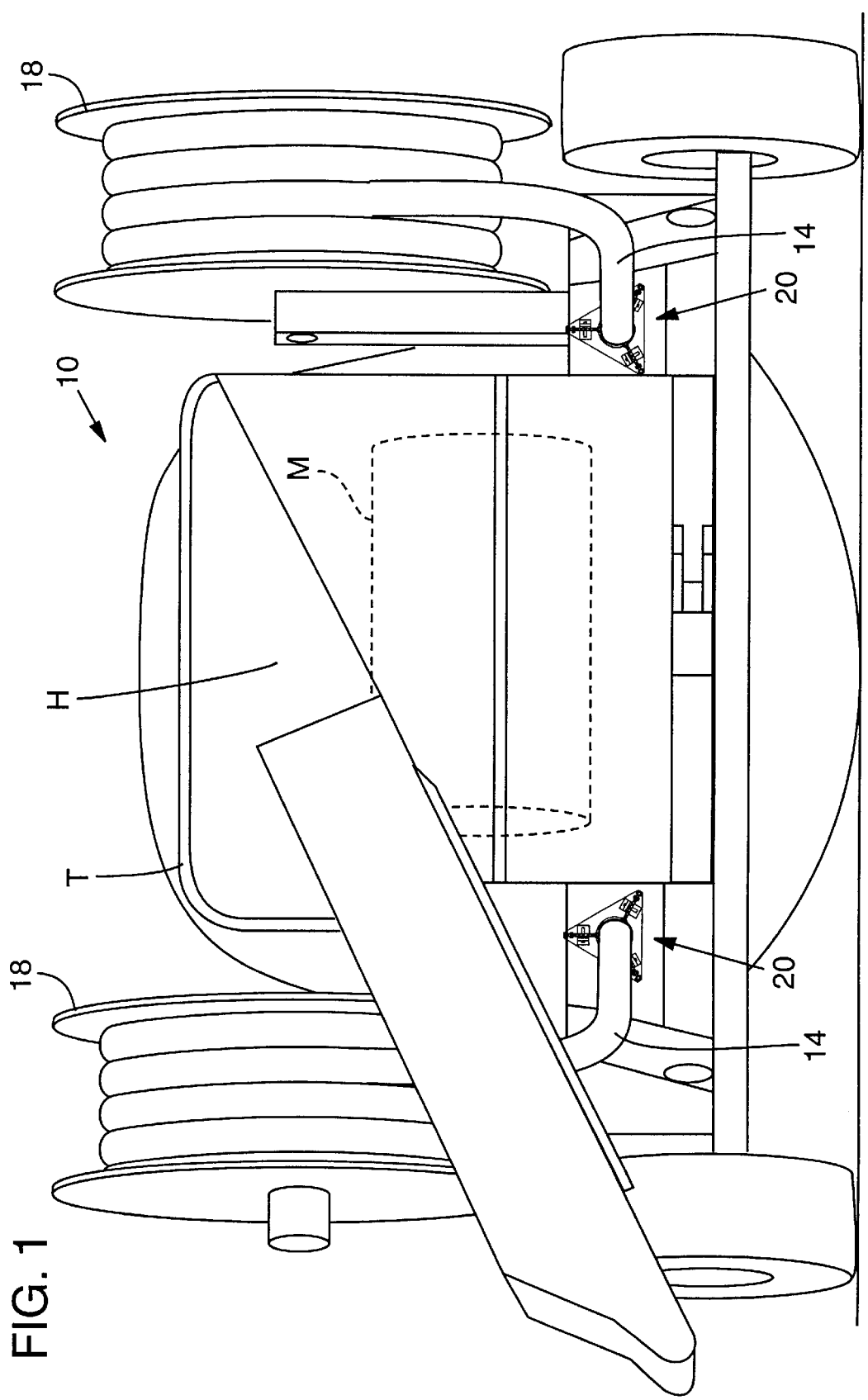
FIG. 1 is a front view of one style of bagging machine for bagging compost material in accordance with the present invention.
Figure 2:
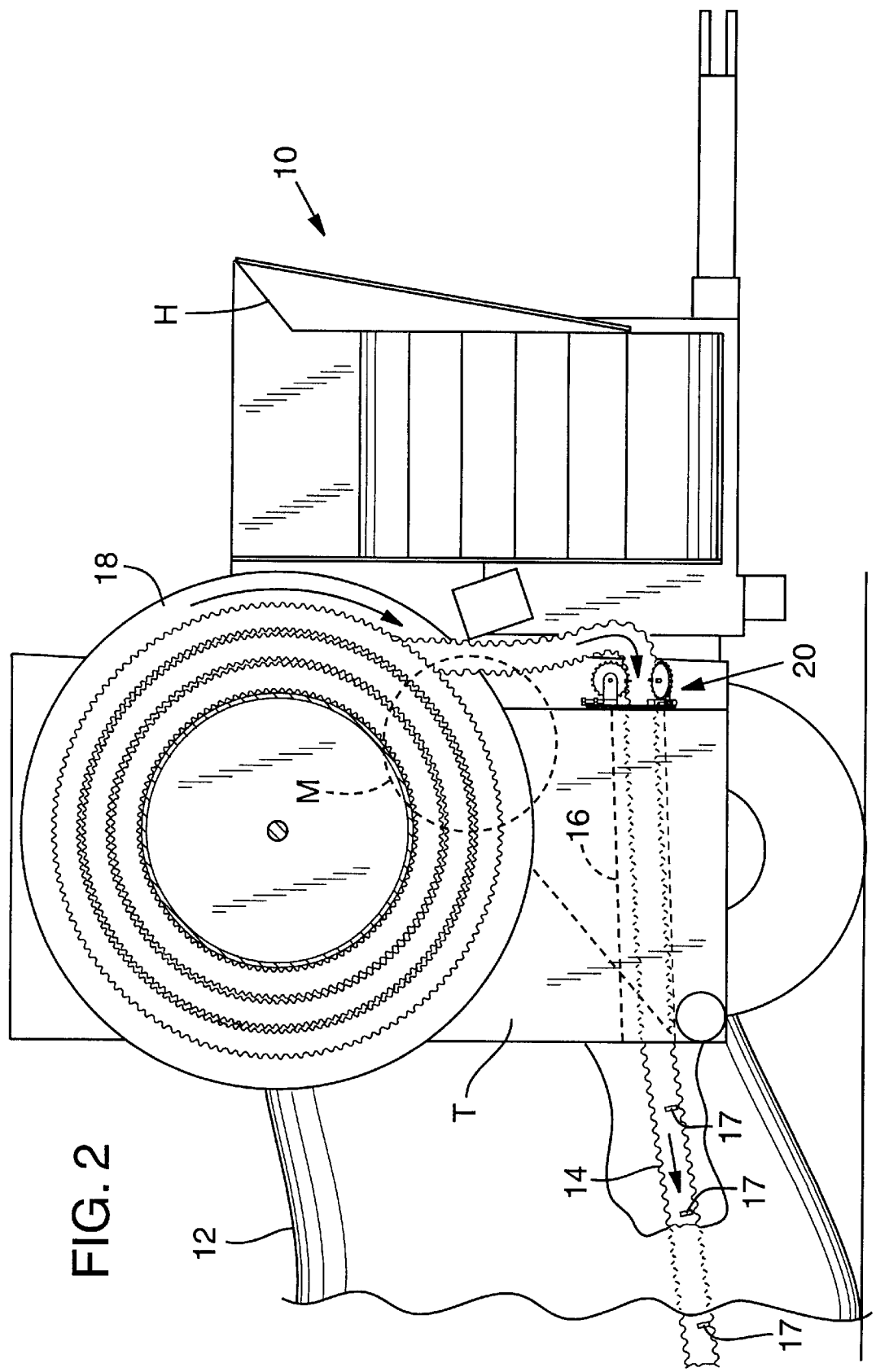
FIG. 2 is a side view of the bagging machine of FIG. 1.

FIGS. 1 and 2 illustrates a bagging machine 10 that is arranged to insert composting material into an elongate plastic bag 12. The machine 10 has a hopper H for receiving material to be deposited into the bag 12. A tunnel portion T has an inlet end adjacent the hopper H and an outlet end that opens into the bag 12. A known feed mechanism M forces the material through the interior of the tunnel portion T of the machine 10 with the material being deposited in the bag 12. As the material is forced into the bag 12, the bag 12 will be deployed off of the machine 10 and will be deposited on the ground. As the bag continues to be filled, the machine is forced to move away from the deployed portion of the bag.

It is preferable to insert conduit 14 into the material that is placed into the bag 12 to provide a means for aerating and otherwise treating the compost material received in the bag 12. As the bag 12 is filled with the compost material and deployed off of the machine 10, the conduit 14 is inserted into the bag 12 where it is anchored by the surrounding compost material. As the machine moves away from the deployed, i.e., filled portion of the bag, the conduit is pulled off of the machine 10. Feed tubes 16 are provided on the machine 10 to direct the conduit 14 into the bag at the proper elevation.

The conduit 14 preferably has perforations or openings in its side wall when placed in the bag 12 so that air may be forced into and through the compost received in the bag 12. In this embodiment, the conduit 14 as illustrated in FIG. 3 is of the corrugated type and thus has upstanding ridges 15 around its circumference (with valleys 13 therebetween) and at spaced intervals along its length.

The machine 10 has a perforating mechanism 20 (explained later with reference to FIGS. 4 and 5) for producing openings 17 in the conduit 14 at spaced intervals along its length to provide an outlet for air to flow into and through the compost placed into the bag 12 of the machine 10. Corrugated conduit 14 is readily available on the market. However, it does not normally have openings in its peripheral diameter and, therefore, the perforating mechanism is provided to provide openings 17 in the periphery of the conduit 14.

The machine 10 has a carriage or reel 18 for receiving rolls of the conduit 14 with the rolls being of sufficient length to extend substantially along the length of the bag 12 that is deployed from the machine 10. The conduit 14 is, however, of the type that may be joined in an end-to-end relation should shorter lengths of the conduit be utilized. The conduit 14 is fed off of the reel 18 and into a feed tube 16 that directs the conduit 14 through the tunnel T and into the bag 12. The perforating mechanism 20 is provided at the inlet of the feed tubes 16 and will perforate the conduit 14 to produce openings 17 as the conduit 14 is fed through the feed tubes 16. The spacing of the perforations can be changed in distance apart by changing the diameter of the perforating wheel and/or multiple placement of the perforating knife points on the perforating wheel. Thus, more or less air can be distributed along the length of the conduit and into the bag.

FIGS. 4 and 5 illustrates the perforating mechanism 20 that is provided for each of the feed tubes 16 of the machine 10. FIG. 4 is an exploded view of the perforating mechanism 20 and FIG. 5 illustrates the conduit 14 being pierced by the perforating mechanism 20. It will be understood, however, that in operation the mechanism 20 is mounted adjacent the inlet to tube 16 as illustrated in FIG. 2.

As illustrated, the perforating mechanism 20 has a base plate 22 on which three perforating wheels 26 are rotatably mounted. The base 22 has an opening 24 that is sufficiently large to surround the inlets of the tubes 16 that direct the conduit 14 into the bag 12. The base 22 is mounted strategic to the tubes 16 and is fixedly mounted to the structure of the machine 10 in a conventional manner. In this embodiment, three wheels 26 are rotatably supported on brackets 28 that extend outwardly from the base 22.

The wheels 26 are rotatably mounted on axles 30 extending from the brackets 28 and are freely rotatable on the axles 30. Each wheel 26 has projecting cogs 32 extending from its periphery in a gear-like manner. The cogs 32 are spaced such that the projecting ridges 15 of the conduit 24 will fit between adjacent cogs 32. In this embodiment, a piercing mechanism such as a blade 36 is mounted on at least one of the cogs 32 of each wheel 26. As shown, the piercing tool (blade) extends beyond the height of the cog 32.

The periphery of the wheels 26, i.e., the cogs 32, extends sufficiently far into the opening 24 such that as the conduit 14 is fed through the opening 24 and into the feed tube 16, wheels 26 will engage the conduit 14 with the cogs 32 fitting between the upstanding ridges 15 of the conduit 14. The wheels 26 being freely rotatable on the axles 30 will simply rotate as the conduit 14 is fed into and through the feed tube 16. This will cause the wheels 26 to rotate and as the piercing blade 36 comes into contact with the valley 13 between the ridges 15 of the conduit 14, the piercing blade 36 will cut an opening 17 into the conduit 14.

While only one piercing blade 36 has been illustrated for each wheel 26, it is contemplated that multiple piercing blades 36 may be installed on cogs 32 to provide more openings into the conduit 14. This will be determined in part by the requirement of the air flow through the compost material placed into the bag 12 on the machine 10. The drawings illustrate the piercing blades 36 on each wheel being at the same radial position relative to each other. It will be appreciated that one or more of the wheels 26 may be rotated to offset the blades 36 and thus offset the openings 17 produced by the piercing blades 36.

Referring again to FIGS. 1 and 2, the perforating mechanism 20 is fixedly mounted to the structure of the tunnel T with the opening 24 surrounding the entry to the feed tube 16. The base 22 is fixedly mounted to the structure of the tunnel T in a conventional manner such as by welding.

In operation the conduit 14 is fed through the perforating mechanism 20 and into the feed tube 16. As the conduit 14 is fed through the perforating mechanism 20 and into the feed tube 16, the conduit will be pierced by the piercing blades 36 to produce openings 17 as illustrated in FIGS. 3 and 4. An end of the conduit 14 is secured to the end of the bag 12 and as material is fed into the bag 12 by the feed mechanism the conduit will be deployed along with the bag 12 as the bag 12 is filled with material. As the conduit 14 is deployed with the bag the piercing blades 36 will produce the openings 17 in the conduit 14.

Those skilled in the art will recognize that modifications and variations may be made without departing from the true spirit and scope of the invention. An example being the use e.g. of four perforating wheel instead of three (two or five etc.). Also the base plate 22 could obviously be changed to provide for different settings of the perforating wheels e.g. a square plate for four wheels or even a staggered arrangement (staggered axially) to provide for five or more wheels. The invention is therefore not to be limited to the embodiments described and illustrated but is to be determined from the appended claims.

What is claimed:

1. A composting machine comprising:

a movable composting tunnel defining a tunnel interior and tunnel exterior and having a materials receiving inlet and an outlet connectable to a deployable bag to be filled with the materials, and feed mechanism feeding materials through said inlet and into the tunnel interior and from the tunnel interior into the bag;

a supply of conduit mounted on the tunnel exterior and a feed tube extended from the tunnel exterior to the tunnel interior for receiving conduit from the supply of conduit and directing the conduit through the tunnel interior and to the outlet, said conduit embedded in the bagged material and drawn through the feed tube upon movement of the tunnel and deployment of the bag;

a perforating device mounted between the supply of conduit and the feed tube, said perforating device including a rotatable wheel having a periphery in engagement with the conduit and rotated as the conduit is drawn into the feed tube, a piercing blade on the periphery of the rotatable wheel that pierces and thereby perforates the conduit during rotation of the wheel.

2. A composting machine as defined in claim 1 wherein the conduit is corrugated to thereby define ridges and the wheel exterior is provided with cogs mated to the ridges to thereby produce rotation of the wheel as the conduit is drawn into the feed tube.

3. A composting machine as defined in claim 2 wherein multiple wheels are spaced around the path of the conduit, each of the wheels engaging the conduit and each having a piercing blade on the wheel exterior to pierce and thereby perforate the conduit.

* * * * *